M. B. KELLER.
Shifting-Tops for Vehicles.
No. 144,107.
Patented Oct. 28, 1873.
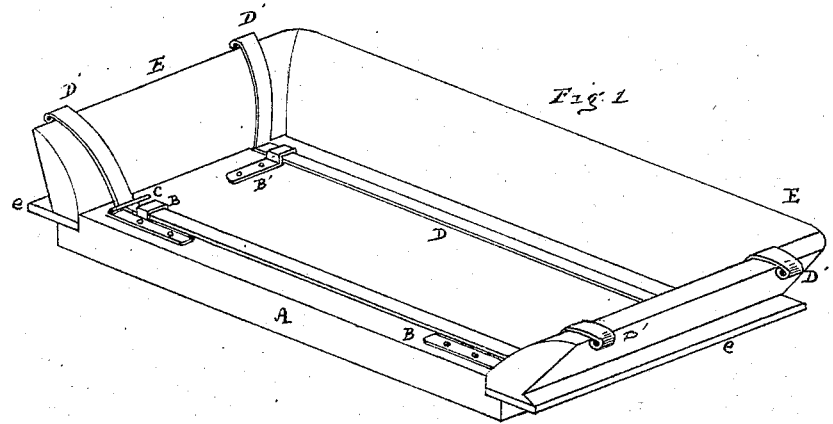
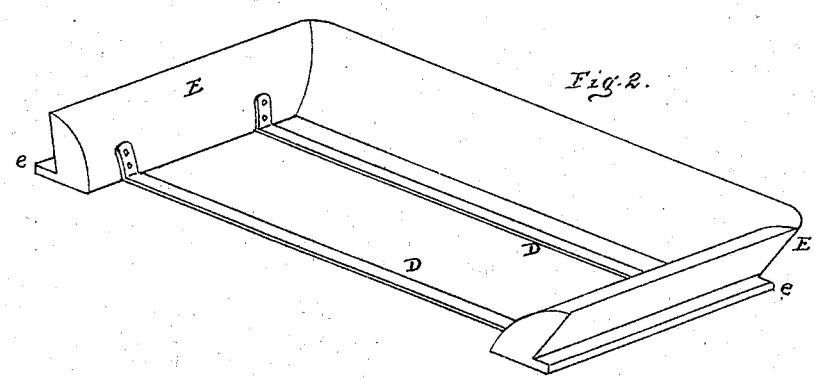
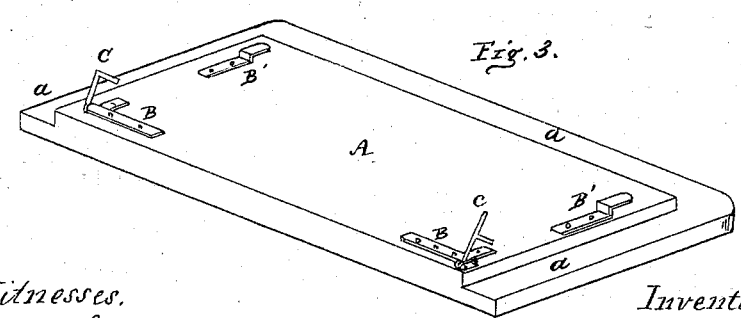
Witnesses.
O. C. Weidler.
Casper Dittman
Inventor.
Martin B. Keller
per J. Stauffer Att.

UNITED STATES PATENT OFFICE.

MARTIN B. KELLER, OF PENN TOWNSHIP, (NEAR LITIZ,) LANCASTER COUNTY, PENNSYLVANIA.

IMPROVEMENT IN SHIFTING TOPS FOR VEHICLES.

Specification forming part of Letters Patent No. 144,107, dated October 28, 1873; application filed July 5, 1873.

*To all whom it may concern:*

Be it known that I, MARTIN B. KELLER, of Penn township, (near Litiz,) in the county of Lancaster and State of Pennsylvania, have made a new and useful Improvement in Shifting Tops on Vehicles, of which the following is a specification:

The nature of my invention consists in constructing the seat of a vehicle and the back and sides of the same separately, so that, whether a top is permanently attached to the latter or not, either can be combined with the seat with ease, and thus the same vehicle can be readily changed from a trotting or open buggy to a top-buggy, or vice versa.

The accompanying drawings clearly show the construction of the same, in which—

Figure 1 shows the combination of the seat, back, and sides and the iron connecting-straps for the top extended; and Fig. 2 shows the back and sides detached, and the straps not extended. Fig. 3 shows the seat proper, common to either or both.

A brief explanation will enable any one skilled in the art to make and use the same.

The top of an ordinary seat, A, is boxed out on the sides, forming a shouldered base, $a$, for the reception of the combined back and sides E of the seat. These sides are braced across, below, by metallic straps D D, so as to come on the top of the seat, unless it is desirable to make a groove so as to leave them flush with the wood. These straps D may be simply attached to the sides below, as shown by Fig. 2, or extended to and beyond the top D' D', to which the ordinary top of a buggy can be permanently attached in the usual manner as when the whole seat is combined, and hence forms a part of the top. This extension is shown in Fig. 1 without showing the top attached thereto, in order to form the top-buggy or vehicle. The top of the seat A, Fig. 3, is provided at four points with raised catch-plates B B B' B', under which the brace-straps D are slid, while the seat-frame rests on the shouldered base $a$. There is a turn-latch, C', with a projecting point to enter the wood of the seat, attached by a pivot to the catch-plates B, which overlap the straps D in front and locks them. The cushions of the seat cover the straps and flat catches and latches, which firmly hold the frame E of the seat with or without the top attached. Thus the vehicle can be used at pleasure either as a trotting or a top buggy, and is readily changed from one to the other without bolts or screws. This mode of shifting is deemed more satisfactory and durable than other modes in use.

What I claim as my invention, and desire to secure by Letters Patent, is—

The seat A, with its shouldered offset $a$ extending around three sides, and provided with catch-plates B B B' B' and latches C, in combination with the detachable back and sides E and braces D D D' D', arranged substantially in the manner and for the purpose set forth.

MARTIN B. KELLER.

Witnesses:
JNO. M. AMWEG,
JACOB STAUFFER.